(12) United States Patent
Arai et al.

(10) Patent No.: US 9,926,839 B2
(45) Date of Patent: Mar. 27, 2018

(54) INTERNAL COMBUSTION ENGINE AND METHOD FOR CONTROLLING INTERNAL COMBUSTION ENGINE

(71) Applicant: Nissan Motor Co., Ltd., Yokohama-shi, Kanagawa (JP)

(72) Inventors: Masahiro Arai, Kanagawa (JP); Kenji Suzuki, Kanagawa (JP); Mitsuhiko Kubota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 28 days.

(21) Appl. No.: 15/306,840

(22) PCT Filed: May 30, 2014

(86) PCT No.: PCT/JP2014/064481
§ 371 (c)(1),
(2) Date: Oct. 26, 2016

(87) PCT Pub. No.: WO2015/181973
PCT Pub. Date: Dec. 3, 2015

(65) Prior Publication Data
US 2017/0051660 A1    Feb. 23, 2017

(51) Int. Cl.
*F02B 37/12*        (2006.01)
*F02B 37/16*        (2006.01)
(Continued)

(52) U.S. Cl.
CPC .............. *F02B 37/12* (2013.01); *F02B 37/16* (2013.01); *F02D 41/005* (2013.01);
(Continued)

(58) Field of Classification Search
CPC ......... F02B 37/12; F02B 37/16; F02M 26/06; F02M 26/17; F02D 41/0007; F02D 41/005; F02D 41/007; Y02T 10/144; Y02T 10/47
(Continued)

(56) References Cited

U.S. PATENT DOCUMENTS 7,311,090 B2 * 12/2007 Lyons .................... F02M 26/14
                                                    123/568.11
7,490,466 B2 *  2/2009 Robel .................... F01N 3/035
                                                    60/274
(Continued)

FOREIGN PATENT DOCUMENTS

EP    2 546 506 A1    1/2013
EP    2 952 729 A1    12/2015
(Continued)

*Primary Examiner* — Audrey K Bradley
*Assistant Examiner* — Dapinder Singh
(74) *Attorney, Agent, or Firm* — Global IP Counselors, LLP (57) ABSTRACT

An internal combustion engine includes an internal combustion engine main body, an intake passage, an exhaust passage, a supercharger, an intake circulation passage, an exhaust circulation passage, an intake circulation valve, an exhaust circulation valve and a controller. The supercharger is provided on the intake passage and the exhaust passage. The supercharger supplies compressed intake air to the internal combustion engine main body. The intake circulation passage connects the sections of the intake passage that are upstream and downstream of the supercharger. The exhaust circulation passage connects sections of the exhaust passage that are upstream and downstream of the supercharger. The intake circulation valve is provided in the intake circulation passage. The exhaust circulation valve is provided in the exhaust circulation passage. The controller is
(Continued)

programmed to close the exhaust circulation valve in accordance with an opening degree of the intake circulation valve.

7 Claims, 8 Drawing Sheets

(51) Int. Cl.
  *F02D 41/00* (2006.01)
  *F02M 26/06* (2016.01)
  *F02M 26/17* (2016.01)
  *F02D 41/26* (2006.01)
(52) U.S. Cl.
  CPC ..... *F02D 41/0007* (2013.01); *F02D 41/0077* (2013.01); *F02D 41/26* (2013.01); *F02M 26/06* (2016.02); *F02M 26/17* (2016.02); *F02D 2200/04* (2013.01); *Y02T 10/144* (2013.01); *Y02T 10/47* (2013.01)
(58) Field of Classification Search
  USPC ........................................................ 60/605.2
  See application file for complete search history.

(56) References Cited

U.S. PATENT DOCUMENTS

| | | | | |
|---|---|---|---|---|
| 8,291,891 B2* | 10/2012 | Alger, II | ............. | F02D 13/0238 |
| | | | | 123/315 |
| 8,316,829 B2* | 11/2012 | Piper | ......................... | F02D 9/04 |
| | | | | 123/179.16 |
| 8,371,266 B1* | 2/2013 | Ulrey | ...................... | F02D 11/02 |
| | | | | 123/336 |
| 2002/0189598 A1* | 12/2002 | Remmels | ............... | F02M 26/16 |
| | | | | 123/568.11 |
| 2011/0252786 A1 | 10/2011 | Okada | | |
| 2012/0046854 A1* | 2/2012 | Sangkyu | ............. | F02D 41/0057 |
| | | | | 701/108 |

FOREIGN PATENT DOCUMENTS

| | | |
|---|---|---|
| JP | 2007-278110 A | 10/2007 |
| WO | 2011/111171 A1 | 9/2011 |
| WO | 2013/187141 A1 | 12/2013 |

\* cited by examiner

INTERNAL COMBUSTION ENGINE AND METHOD FOR CONTROLLING INTERNAL COMBUSTION ENGINE

CROSS-REFERENCE TO RELATED APPLICATIONS

This application is a U.S. National stage application of International Application No. PCT/JP2014/064481, filed on May 30, 2014.

BACKGROUND

Field of the Invention

The present invention relates to an internal combustion engine and a method for controlling an internal combustion engine.

Background Information

In the internal combustion engine disclosed in JP2007-278110A, a recirculation valve is provided in a recirculation passage that connects a downstream compressor with an upstream compressor of an intake passage. In addition, an EGR valve is provided in an exhaust circulation passage that connects the exhaust passage and the upstream compressor of the intake passage.

SUMMARY

When the EGR valve is open and the recirculation valve is opened, gas containing exhaust is recirculated from downstream of the compressor to upstream of the compressor through the recirculation passage. The recirculated gas can be blown back upstream of the confluence portion of the exhaust circulation passage. When gas that is blown back in this manner passes through the confluence portion, blown-back gas containing exhaust and exhaust that is recirculated via the exhaust circulation passage are merged, and there is the risk that the exhaust recirculation amount that is introduced into the combustion chamber becomes excessive.

In view of the problem described above, objects of the present invention are to provide an internal combustion engine that can prevent the exhaust recirculation amount from becoming excessive and a method for controlling the internal combustion engine.

The internal combustion engine according to one embodiment of the present invention comprises: an internal combustion engine main body; an intake passage that circulates intake air introduced into the internal combustion engine main body; an exhaust passage that circulates exhaust discharged by the internal combustion engine main body; a supercharger provided in the intake passage and the exhaust passage that compresses and supplies intake air to the internal combustion engine main body; an intake circulation passage that connects the upstream and downstream side portions of the supercharger of the intake passage; an exhaust circulation passage that connects the exhaust passage and the upstream side portion of the supercharger of the intake passage; an intake circulation valve provided in the intake circulation passage; and an exhaust circulation valve provided in the exhaust circulation passage. The internal combustion engine further comprises a control unit that closes the exhaust circulation valve when the intake circulation valve is opened.

DETAILED DESCRIPTION OF THE EMBODIMENTS

Embodiments of the present invention will be described below, with reference to the appended drawings. The same reference symbols appended throughout several drawings indicate the same or corresponding configurations.

First Embodiment

Figure 1:
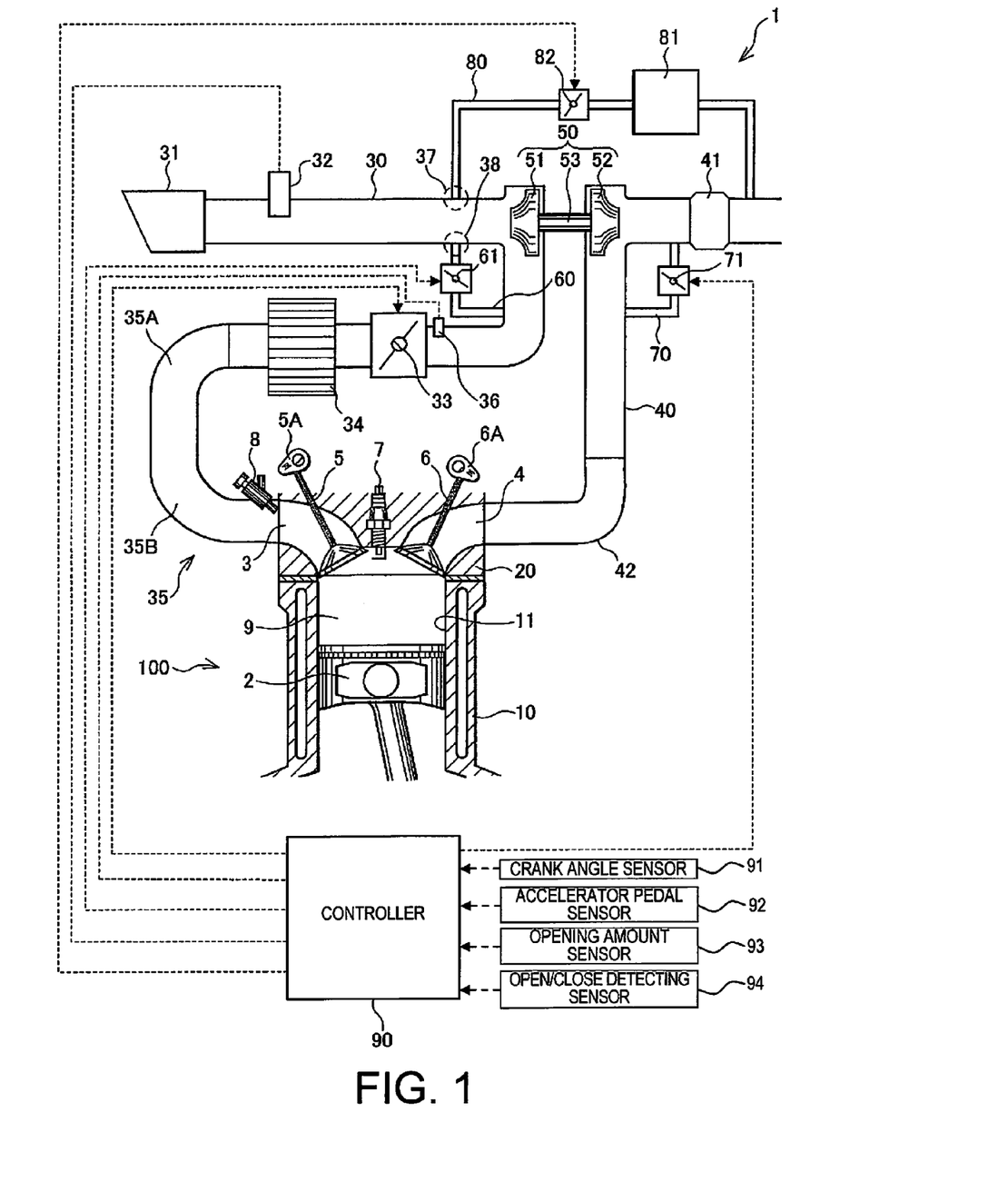
FIG. 1 is a schematic diagram of the internal combustion engine according to a first embodiment.

FIG. 1 is a schematic overview of the internal combustion engine 1 according to the first embodiment. In addition to the main body 100, the internal combustion engine 1 comprises an intake passage 30, an exhaust passage 40, a supercharger 50, and a controller 90.

The main body 100 is an internal combustion engine main body comprising a cylinder block 10 and a cylinder head 20. A cylinder 11 is formed in the cylinder block 10. The cylinder 11 houses a piston 2. The combustion chamber 9 is formed by the crown surface of the piston 2, the wall surface of the cylinder 11, and the lower surface of the cylinder head 20. An air-fuel mixture is combusted in the combustion chamber 9. The piston 2 reciprocates in the cylinder 11 by receiving combustion pressure.

The cylinder head 20 is disposed on the upper side of the cylinder block 10. An intake port 3 and an exhaust port 4 are formed in the cylinder head 20. The intake port 3 supplies intake air to the combustion chamber 9. The exhaust port 4 discharges exhaust from the combustion chamber 9.

An intake valve 5 and an exhaust valve 6 are provided in the cylinder head 20. The intake valve 5 opens and closes the intake port 3. The exhaust valve 6 opens and closes the exhaust port 4. The intake valve 5 is driven by an intake side cam 5A, and the exhaust valve 6 is driven by an exhaust side cam 6A.

In the cylinder head 20, the portion between the intake valve 5 and the exhaust valve 6 is provided with a spark plug 7. The spark plug 7 ignites the air-fuel mixture inside the combustion chamber 9.

The intake passage 30 circulates intake air that is introduced into the main body 100. The exhaust passage 40 circulates the exhaust that is discharged from the main body 100. A supercharger 50 is provided in the intake passage 30 and the exhaust passage 40.

The supercharger 50 compresses and supplies intake air to the main body 100. The supercharger 50 is a turbocharger, and comprises a compressor 51, a turbine 52, and a shaft 53. The compressor 51 is provided in the intake passage 30. The turbine 52 is provided in the exhaust passage 40. The shaft 53 connects the compressor 51 and the turbine 52. In the supercharger 50, the compressor 51 is rotated via the shaft 53 and compresses intake air, by the turbine 52 being rotated by the exhaust.

The intake passage 30 leads intake air to the intake port 3 via an intake manifold 35. The intake passage 30 is provided with an air cleaner 31, an airflow meter 32, the compressor 51, a throttle valve 33, and an intercooler 34, in that order from the upstream side.

The air cleaner 31 filters the intake air that is introduced into the main body 100. The air cleaner 31 is provided in the upstream side end of the intake passage 30. The airflow meter 32 measures the flow rate of the intake air.

The throttle valve 33 adjusts the =punt of intake air that is introduced into the main body 100. The throttle valve 33 adjusts the amount of intake air by changing the intake air flow area of the intake passage 30.

The intercooler 34 cools the intake air that has become heated (high-temperature) by being compressed by the compressor 51. Intake air that has passed through the intercooler 34 is distributed to each cylinder via the intake manifold 35.

The intake manifold 35 comprises a collector portion 35A and a branch pipe 35B. The collector portion 35A is a volume chamber. The branch pipe 35B connects the collector portion 35A and the intake port 3 of each cylinder. The branch pipe 35B is provided with a fuel injection valve 8. The fuel injection valve 8 injects fuel corresponding to the operating conditions of the engine. The fuel injection valve 8 can be disposed so as to directly inject fuel into the combustion chamber 9.

In the intake passage 30, the portion between the compressor 51 and the throttle valve 33 is provided with a pressure sensor 36. The pressure sensor 36 detects a downstream pressure P of the supercharger 50 in the intake passage 30. The downstream pressure P is the pressure of the intake air after passing through the compressor 51. Accordingly, the pressure sensor 36 is capable of detecting the supercharging pressure.

The exhaust passage 40 circulates the exhaust that is discharged from the exhaust port 4 via an exhaust manifold 42. The exhaust passage 40 is provided with a turbine 52 and a catalytic converter 41 in that order from the upstream side. The exhaust that is discharged to the exhaust passage 40 rotates the turbine 52, then is purified by the catalytic converter 41, and discharged to the outside. A three-way catalytic converter can be used as the catalytic converter 41.

The internal combustion engine 1 further comprises an intake circulation passage 60 and a recirculation valve 61. Below, the recirculation valve 61 is referred to as R/V 61. The intake circulation passage 60 is provided with the intake passage 30. The intake circulation passage 60 connects the portions of the intake passage 30 that are further on the upstream side and on the downstream side of the supercharger 50, specifically of the compressor 51. The downstream side portion is the portion of the intake passage 30 further on the upstream side of the throttle valve 33.

The intake circulation passage 60 recirculates a portion of the intake air after passing through the compressor 51 to upstream of the compressor 51. The R/V 61 is provided in the intake circulation passage 60. An open/close valve that opens and closes the intake circulation passage 60 is used as the R/V 61. The R/V 61 prevents the supercharging pressure from becoming too high when the throttle valve 33 is opened, such as during deceleration of the internal combustion engine 1, by recirculating the intake air via the intake circulation passage 60.

The internal combustion engine 1 further comprises a bypass passage 70 and a waste gate valve 71. Below, the waste gate valve 71 is referred to as WGV 71. The bypass passage 70 is provided with the exhaust passage 40. The bypass passage 70 connects the portions of the exhaust passage 40 further on the upstream side and on the downstream side of the turbine 52. The downstream side portion is the portion further on the upstream side of the catalytic converter 41. The bypass passage 70 circulates the exhaust so as to bypass the turbine 52.

The WGV 71 is provided with the bypass passage 70. The WGV 71 adjusts the flow rate of the exhaust that is circulated in the bypass passage 70. The WGV 71 adjusts the rotational frequency of the turbine 52 and the compressor 51, that is, the rotational speed of the supercharger 50, by adjusting the flow rate of the exhaust.

The internal combustion engine 1 further comprises an exhaust passage 80, an EGR cooler 81, and an EGR valve 82. The exhaust circulation passage 80 connects the exhaust passage 40 and the intake passage 30. Specifically, the exhaust circulation passage 80 connects the exhaust passage 40, and the portion of the intake passage 30 that is further on the upstream side of the supercharger 50, specifically of the compressor 51. The exhaust circulation passage 80 recirculates a portion of the exhaust that is circulated in the exhaust passage 40 to the intake passage 30.

The exhaust circulation passage 80 is provided with an EGR cooler 81 and an EGR valve 82. The EGR cooler 81 is a cooling device that cools the external EGR gas, that is, the exhaust that is recirculated without passing through the combustion chamber 9. The EGR valve 82 adjusts the flow rate of the exhaust that is circulated in the exhaust circulation passage 80. The confluence portion 37 of the intake passage 30 where the exhaust circulation passage 80 is merged therewith is provided in the same position as the confluence portion 38 of the intake passage 30 where the intake circulation passage 60 is merged therewith, in the circulation direction of the intake air.

The internal combustion engine 1 further comprises a controller 90. The controller 90 is an electronic control device, and signals from the airflow meter 32, the pressure sensor 36, a crank angle sensor 91, an accelerator pedal sensor 92, an opening amount sensor 93, and an open/close detecting sensor 94 as various sensors and switches, are input into the controller 90.

The crank angle sensor 91 generates a crank angle signal for each predetermined crank angle. The crank angle signal is used as a signal that represents the rotational speed NE of the internal combustion engine 1. The accelerator pedal sensor 92 detects the depression amount of the accelerator pedal provided to a vehicle that is equipped with the internal combustion engine 1. The depression amount of the accelerator pedal is used as a signal that represents the load KL of the internal combustion engine 1. The opening amount sensor 93 detects the opening amount of the throttle valve 33. The opening amount sensor 93 is provided with the throttle valve 33. An open/close detecting sensor 94 detects the open/close state of the R/V 61. The open/close detecting sensor 94 is provided with the R/V 61.

The controller 90 controls control targets, such as the R/V 61 and the EGR valve 82, based on input signals from the various sensors and switches described above. The controller 90 controls the R/V 61 and the EGR valve 82 according to the operating conditions of the engine. The operating conditions of the engine are, for example, the rotational speed NE and the load KL. Such a controller 90 carries out intake recirculation with the R/V 61 and exhaust recirculation with the EGR valve 82, in the internal combustion engine 1.

Upon opening the R/V 61, the controller 90, for example, opens the R/V 61 when the operating condition of the engine shifts from a supercharge-operating region to a region outside of the supercharge-operating region, and when the magnitude of the difference in the intake flow rate before and after the shift in the operating condition of the engine is greater than a predetermined value. The predetermined value is a value that is set in advance for determining whether or not a surge occurs in the intake air that heads toward the compressor 51 downstream of the compressor 51. The intake flow rate described above to be used can be set in map data in advance according to the operating condition of the engine.

Figure 2:
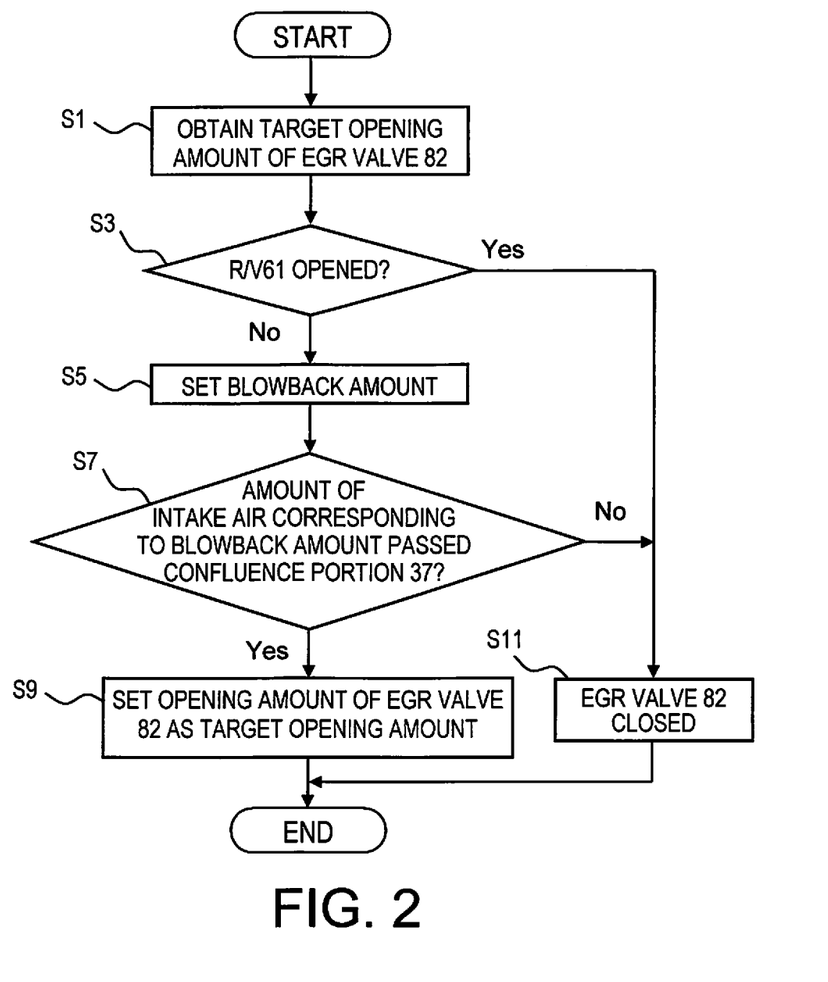
FIG. 2 is a flowchart illustrating one example of a control carried out by the controller in the first embodiment.

Next, one example of a control that is carried out by the controller 90 in the present embodiment will be described using the flowchart illustrated in FIG. 2. The process of the flowchart illustrated in FIG. 2 is carried out when the operating condition of the engine is in an operation region in which exhaust recirculation via the exhaust circulation passage 80 is carried out.

In Step S1, the controller 90 obtains a target opening amount of the EGR valve 82. The target opening amount of the EGR valve 82 can be obtained by calculation, or from map data in which target opening amounts are set in advance according to the operating condition of the engine.

In Step S3, the controller 90 determines whether or not the R/V 61 is opened. Whether or not the R/V 61 is opened can be determined based on the output of the open/close detecting sensor 94. If a positive determination, the process proceeds to Step S11.

In Step S11, the controller 90 closes the EGR valve 82. In Step S11, the controller 90 sets the opening amount of the EGR valve 82 to the target opening amount, and in turn closes the EGR valve 82.

The EGR valve 82 is thereby closed when the R/V 61 is opened. Upon closing the EGR valve 82 in this manner, the controller 90 can, for example, close the EGR valve 82 when the R/V 61 is opened based on the opening amount of the throttle valve 33, that is, immediately before the R/V 61 is opened. After Step S11, the process returns to Step S1.

In the subsequent routine, the above-described process is repeated while the R/V 61 is opened. Then, when the R/V 61 is closed, the process proceeds to Step S5 as a result of a negative determination in Step S3. In this case, the controller 90 sets a blowback amount described next.

Figure 3:
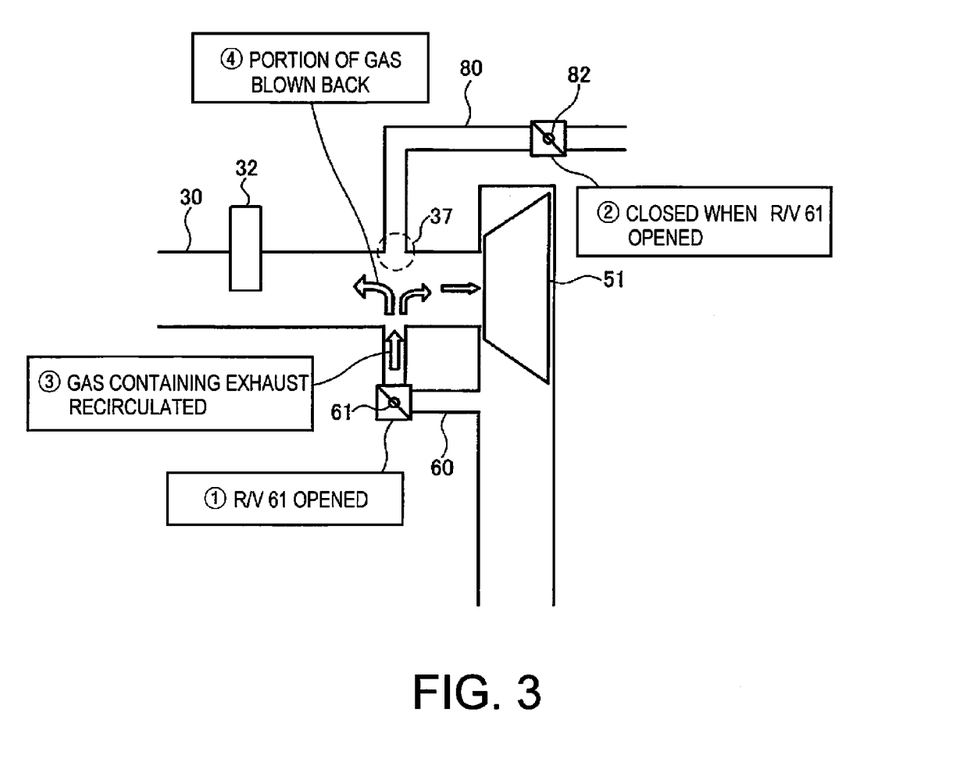
FIG. 3 is a diagram of the blowback amount control.

FIG. 3 is an explanatory view of a blowback amount. First, if the R/V 61 is opened, the EGR valve 82 is closed in response to the R/V 61 being opened. While the R/V 61 is opened, gas containing the exhaust is recirculated from the downstream of the compressor 51 to the upstream of the compressor 51 of the intake passage 30 via the intake circulation passage 60. A portion of the recirculated gas is blown back upstream by the confluence portion 37.

In the description above, the blowback amount is the amount of the gas that is recirculated to the intake passage 30 via the intake circulation passage 60 while the R/V 61 is opened and blown back upstream by the confluence portion 37. The blowback amount is changed according to the downstream pressure P and the opened time of the R/V 61, which are parameters that affect the blowback amount.

Accordingly, the controller 90 sets the blowback amount based on at least one of the downstream pressure P and the opened time of the R/V 61 in Step S5. The blowback amount that is set by the controller 90 can be obtained by calculation, or be obtained from map data in which blowback amounts are set in advance according to the downstream pressure P and the opened time of the R/V 61. The blowback amount is increased as the opened time of the R/V 61 is increased. In addition, the blowback amount is increased as the downstream pressure P is increased.

Following Step S5, the controller 90 determines whether or not an amount of intake air corresponding to the blowback amount has passed the confluence portion 37, in Step S7. Specifically, having passed the confluence portion 37 means having passed through the passage of the portion of the intake passage 30 to which the confluence portion 37 is provided. Whether or not an amount of intake air corresponding to the blowback amount has passed the confluence portion 37 can be determined based on the output of the airflow meter 32. If a negative determination, the process proceeds to Step S11. Therefore, the EGR valve 82 remains closed. If a positive determination, the process proceeds to Step S9. In this case, the controller 90 sets the opening amount of the EGR valve 82 to the target opening amount that is obtained in Step S1. After Step S9, the process returns to Step S1.

Next, the main action and effects of the present embodiment will be described. The internal combustion engine 1 comprises the main body 100, the intake passage 30, the exhaust passage 40, the supercharger 50, the intake circulation passage 60, the exhaust circulation passage 80, the R/V 61, the EGR valve 82, and the controller 90 that closes the EGR valve 82 when the R/V 61 is opened.

The internal combustion engine 1 configured in this manner is capable of preventing gas containing exhaust from being mixed with the exhaust that is recirculated via the exhaust circulation passage 80, when the gas passes the confluence portion 37 so as to return to the downstream side, after being recirculated via the intake circulation passage 60 and blown back upstream by the confluence portion 37. Accordingly, it is possible to prevent the exhaust recirculation amount from becoming excessive.

Meanwhile, it is also possible to correct the target opening amount of the EGR valve 82 or, with the expectation that the exhaust recirculation amount will become excessive, to set the target opening amount of the EGR valve 82 so as to have a margin, in order to prevent the exhaust recirculation amount from becoming excessive. However, in these cases, correction cannot be made accurately, and by setting the target opening amount so as to have a margin, the fuel efficiency improving effect and the exhaust emission improvement effect due to exhaust recirculation will be degraded.

In light of these circumstances, in the internal combustion engine 1 of the present embodiment, the controller 90 further opens the EGR valve 82 when an amount of intake air corresponding to the blowback amount has passed the confluence portion 37 after the R/V 61 is closed. In an internal combustion engine 1 configured in this manner, since it is possible to prevent blown-back gas containing exhaust and exhaust that is recirculated via the exhaust circulation passage 80 from being mixed, correcting the target opening amount of the EGR valve 82 and setting a target opening amount that has a margin becomes unnecessary. Therefore, when carrying out exhaust recirculation, it is possible to ensure a fuel efficiency improvement effect and an exhaust emission improvement effect, which are obtained by carrying out exhaust recirculation.

In the internal combustion engine 1 of the present embodiment, the controller 90 sets the blowback amount based on at least one of the downstream pressure P and the opened time of the R/V 61. It is thereby possible to open the EGR valve 82, when an amount of intake air corresponding to the blowback amount of gas that has actually been blown back, has passed the confluence portion 37 after the R/V 61 is closed. Accordingly, it is possible to resume the exhaust recirculation at an appropriate timing that corresponds to the actual blowback amount of gas.

The controller 90 is capable of accurately setting the blowback amount by setting a blowback amount based on the downstream pressure P and the opened time of the R/V 61. As a result, it is possible to resume the exhaust recirculation at an appropriate timing that corresponds to the actual blowback amount of gas.

Second Embodiment

In the internal combustion engine 1 of the present embodiment, the blowback amount is set to a constant value, specifically, to the volume of the passage space that is upstream of the confluence portion 37, instead of the controller 90 setting the blowback amount. The passage space volume is the volume of the passage space from the confluence portion 37 upstream to the air cleaner 31. The passage space volume may also be the volume of the passage space from the confluence portion 37 upstream to the upstream end of the intake passage 30.

Figure 4:
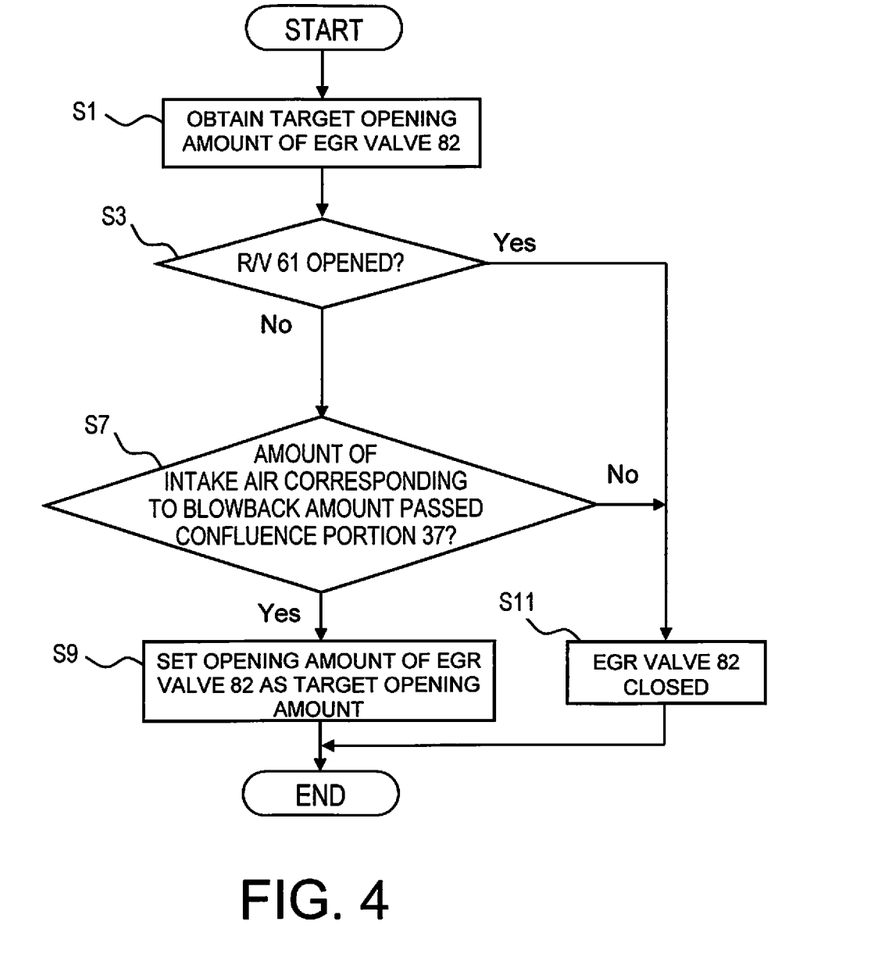
FIG. 4 is a flowchart illustrating one example of a control carried out by the controller in a second embodiment.

The controller 90 in the present embodiment carries out a control that omits the process of Step S5 illustrated in FIG. 2 in contrast to the controller 90 in the first embodiment, as illustrated in FIG. 4.

Next, the main action and effects of the internal combustion engine 1 of the present embodiment will be described. Here, when a backflow of gas containing exhaust occurs, fresh air will pass the confluence portion 37, at the latest after an amount of intake air corresponding to the volume of the passage space that is upstream of the confluence portion 37 has passed the confluence portion 37.

In view of such circumstances, in the internal combustion engine 1 of the present embodiment, the blowback amount is set as the volume of the passage space that is upstream of the confluence portion 37. That is, the blowback amount is considered as the passage space volume. Accordingly, by eliminating the need to set the blowback amount, the internal combustion engine 1 of the present embodiment is capable of achieving simplification of control and of preventing the exhaust recirculation amount from becoming excessive.

Figure 5:
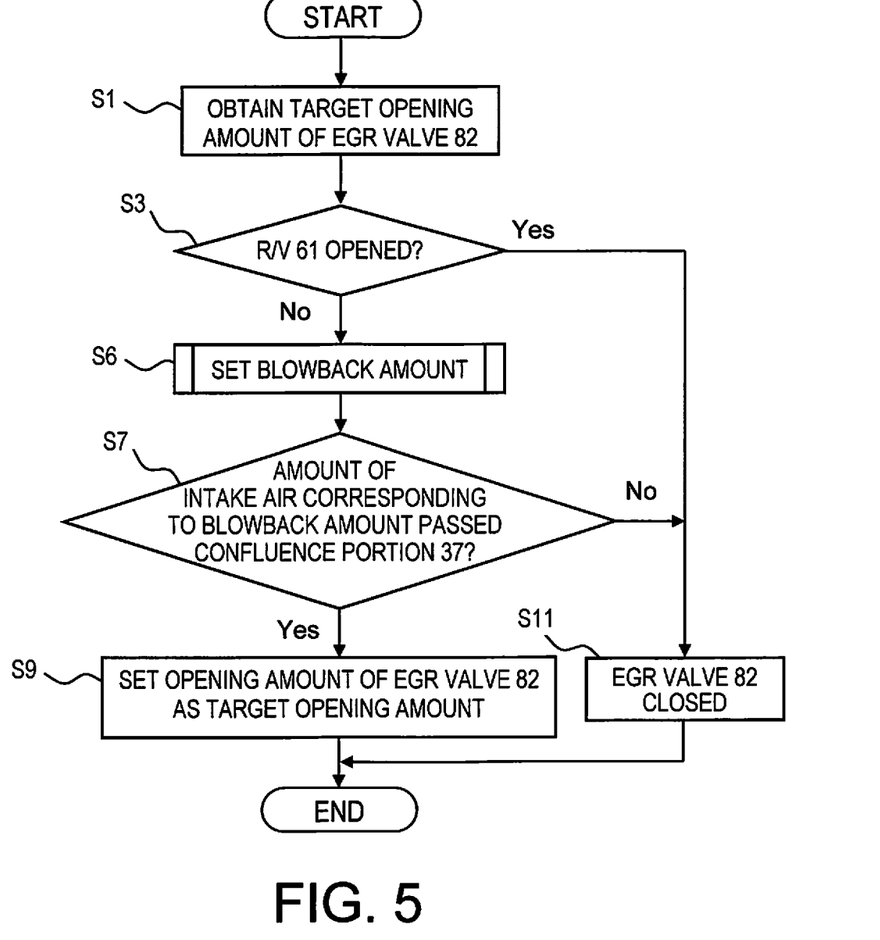
FIG. 5 is a flowchart illustrating one example of a control carried out by the controller in the third embodiment.

In an internal combustion engine 1 configured in this manner, it is also possible to ensure the accuracy of the blowback amount when the actual blowback amount is greater than or equal to the passage space volume. In addition, it is possible to resume the EGR early compared to the internal combustion engine 1 of the first embodiment, when the actual blowback amount is greater than or equal to the passage space volume Third Embodiment In the internal combustion engine 1 of the present embodiment, the controller 90 sets the blowback amount in the manner described below. That is, following the negative determination in Step S3 described above, the blowback amount is set in Step S6, as illustrated in FIG. 5. The setting of the blowback amount in Step S6 is carried out in the subroutine illustrated in FIG. 6.

Figure 6:
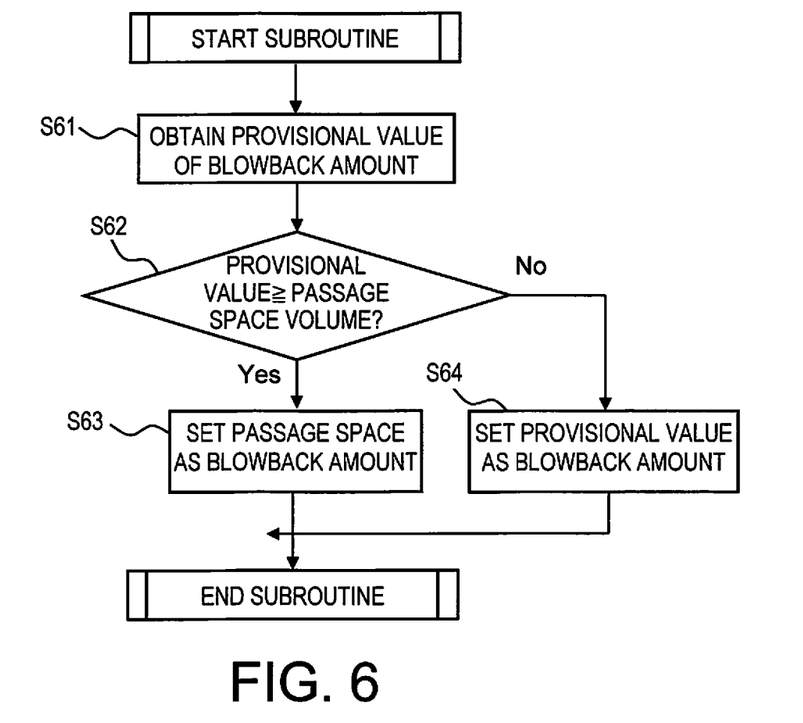
FIG. 6 is a flowchart illustrating a subroutine of the flowchart illustrated in FIG. 5.

In Step S61, the controller 90 obtains a blowback amount as a provisional value based on at least one of the downstream pressure P and the opened time of the R/V 61, as illustrated in FIG. 6. The blowback amount as a provisional value can be obtained by calculation or be obtained from map data, in the same way as when setting the blowback amount described in the first embodiment.

Next, in Step S62, the controller 90 determines whether or not the blowback amount as a provisional value is greater than or equal to the volume of the passage space upstream of the confluence portion 37. A case in which the blowback amount as a provisional value is the passage space volume can be included as a case in which the blowback amount as a provisional value is smaller than the passage space volume.

If there is a positive determination in Step S62, the process proceeds to Step S63. In this case, the controller 90 sets the passage space volume to the blowback amount. If there is a negative determination in Step S62, the process proceeds to Step S64. In this case, the controller 90 sets the blowback amount as a provisional value as the blowback amount.

The subroutine to set the blowback amount is completed after Step S63 or Step SM. Accordingly, the process returns to the flowchart of FIG. 5. In the flowchart illustrated in FIG. 5, the same process as the process described above using FIG. 2 in the first embodiment is carried out after Step S7.

Next, the main action and effects of the internal combustion engine 1 of the present embodiment will be described. In the internal combustion engine 1 of the present embodiment, the controller 90 obtains a blowback amount as a provisional value, based on at least one of the downstream pressure P and the opened time of the R/V 61. Then, when the blowback amount as a provisional value is greater than the volume of the passage space upstream of the confluence portion 37, the passage space volume is set as the blowback amount. In addition, when the blowback amount as a provisional value is smaller than the passage space volume, the blowback amount as a provisional value is set as the blowback amount.

Accordingly, in the internal combustion engine 1 of the present embodiment, it is possible to achieve simplification of control and to prevent the exhaust recirculation amount from becoming excessive, as described in the second embodiment, when the blowback amount as a provisional value is greater than the volume of the passage space upstream of the confluence portion 37. In addition, it is possible to ensure accuracy of the blowback amount and to achieve an early resumption of the EGR.

In the internal combustion engine 1 of the present embodiment, it is possible to prevent the exhaust recirculation amount from becoming excessive and to resume the exhaust recirculation at an appropriate timing that corresponds to the actual blowback amount of gas in the same manner as the internal combustion engine 1 of the first embodiment, when the blowback amount as a provisional value is smaller than the passage space volume. Also in this case, compared to the internal combustion engine 1 of the second embodiment, it is possible to improve the accuracy of the blowback amount and to achieve an early resumption of the EGR.

Embodiments of the present invention were described above, but the above-described embodiments illustrate only a portion of the application examples of the present invention, and are not intended to limit the technical scope of the present invention to the specific configurations of the above-described embodiments.

In the above-described embodiments, cases were described in which the internal combustion engine 1 is provided with a control unit and a setting unit by being provided with a controller 90. However, the control unit and the setting unit can be realized, for example, by a plurality of controllers.

In the above-described embodiments, cases were described in which the R/V 61 is an open/close valve. However, the R/V 61 can be a flow rate adjustment valve as well. In this case, the controller 90 can further set the blowback amount based on the opening amount of the R/V 61. This is because the blowback amount is increased as the opening amount of the R/V 61 is increased.

In the above-described embodiments, cases were described in which the controller 90 opens the EGR valve 82 when an amount of intake air corresponding to the blowback amount has passed the confluence portion 37 after the R/V 61 is closed.

However, in such a case, the controller 90 can close the EGR valve when a predetermined time has elapsed after the R/V 61 is closed. That is, the controller 90 can open the EGR valve 82 based on the elapsed time after the R/V 61 is closed, instead of the blowback amount.

It can be said that the predetermined time is obtained by converting the blowback amount to the elapsed time equivalent thereof. Accordingly, the predetermined time can be set based on the downstream pressure P and the opened time of the R/V 61, in the same manner as for the blowback amount. The predetermined time described above can be a constant value as well. The constant value can be a value with which fresh air will pass through the confluence portion 37 after the R/V 61 is closed.

In the above-described embodiments, cases were described in which the confluence portion 37 is provided in the same position as the confluence portion 38 in the flow direction of the intake air, and in which the blowback amount is a predetermined value.

Figure 7:
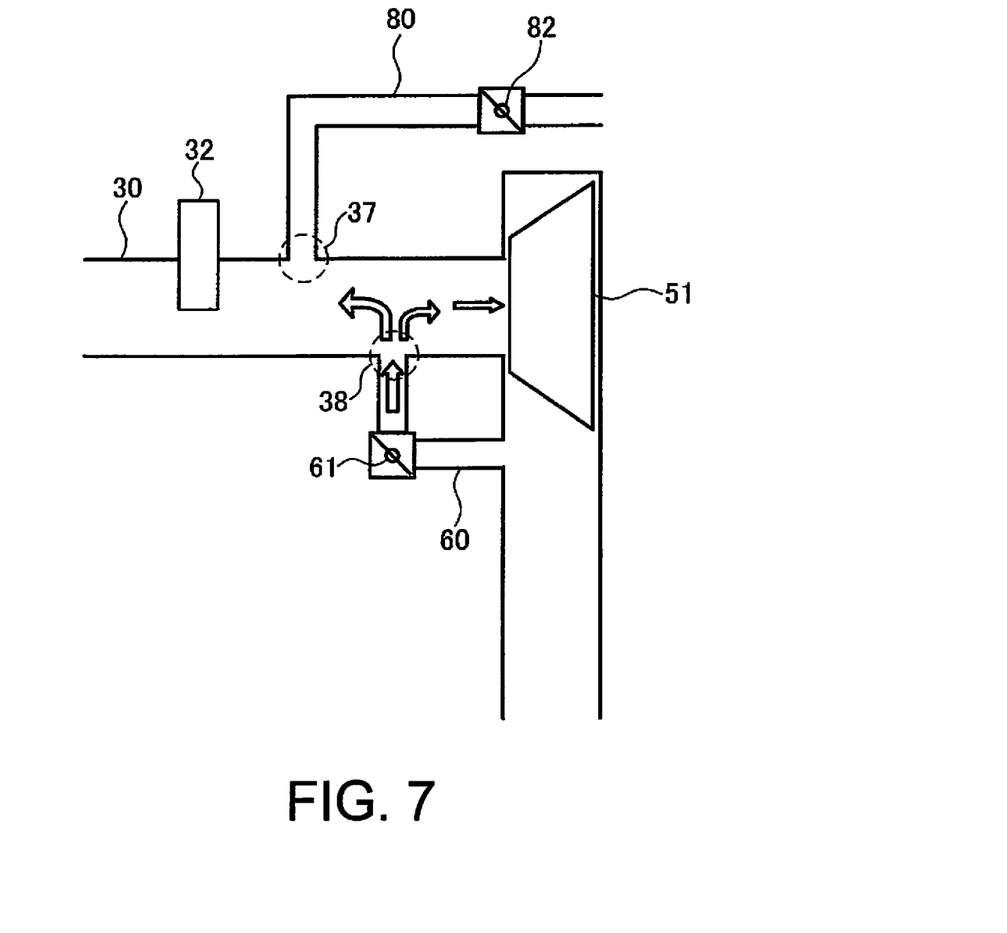
FIG. 7 is a diagram illustrating a first modified example of the arrangement of the confluence portion of the exhaust circulation passage.

However, the confluence portion 37 can be provided upstream of the confluence portion 38 in the flow direction of the intake air, as illustrated in FIG. 7. In this case, instead of setting the blowback amount as a predetermined amount, a value obtained by subtracting the volume of the intake passage between the confluence portion 37 and the confluence portion 38 from the blowback amount can be set a predetermined amount.

Figure 8:
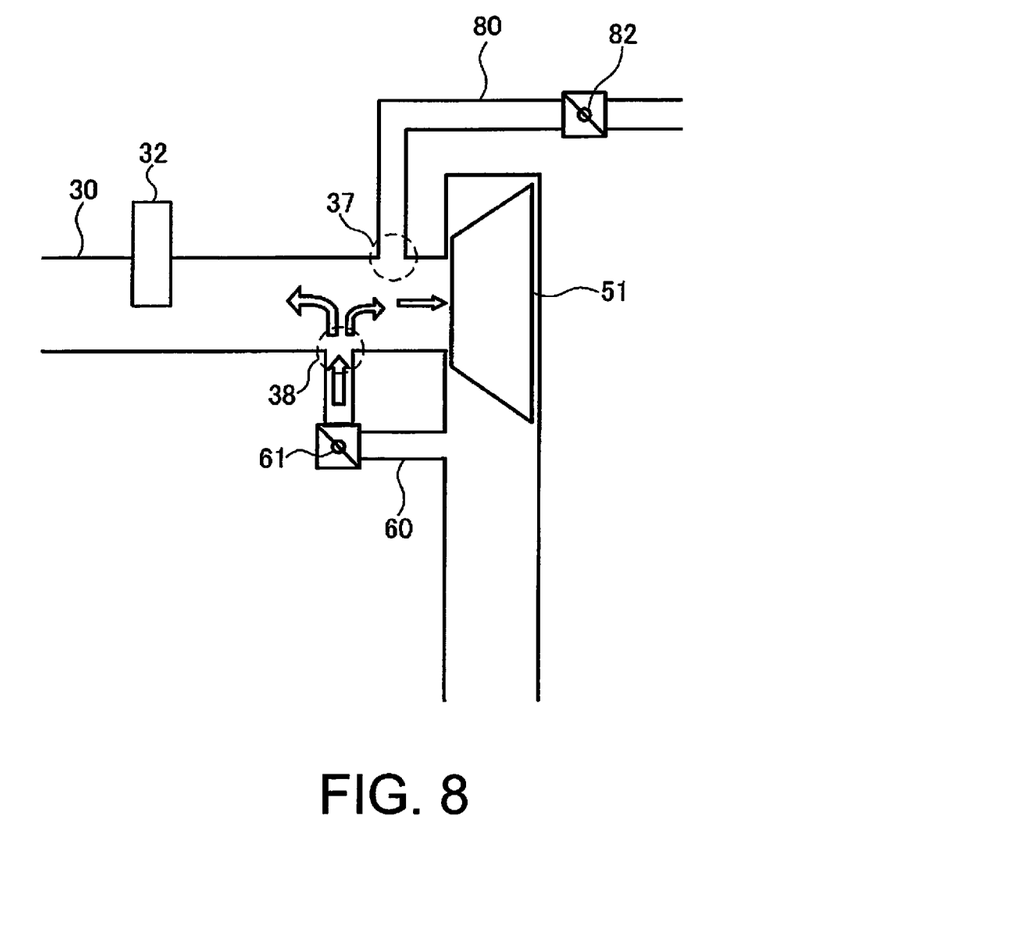
FIG. 8 is a diagram illustrating a second modified example of the arrangement of the confluence portion of the exhaust circulation passage.

The confluence portion 37 can be provided downstream of the confluence portion 38 in the flow direction of the intake air, as illustrated in FIG. 8. In this case, instead of setting the blowback amount as a predetermined amount, a value obtained by adding the volume of the intake passage between the confluence portion 37 and the confluence portion 38 to the blowback amount can be set a predetermined amount.

The invention claimed is:

1. An internal combustion engine comprising:
an internal combustion engine main body;
an intake passage that circulates intake air that is introduced into the internal combustion engine main body;
an exhaust passage that circulates exhaust that is discharged by the internal combustion engine main body;
a supercharger provided in the intake passage and the exhaust passage, which compresses and supplies intake air to the internal combustion engine main body;
an intake circulation passage that connects upstream and downstream side portions of the supercharger in the intake passage;
an exhaust circulation passage that connects the exhaust passage and the upstream side portion of the supercharger in the intake passage;
an intake circulation valve provided in the intake circulation passage;
an exhaust circulation valve provided in the exhaust circulation passage; and
at least one controller programmed to close the exhaust circulation valve upon determining the intake circulation valve is opened, and open the exhaust circulation valve upon determining a predetermined amount of intake air has passed a confluence portion of the intake passage, where the exhaust circulation passage merges the intake passage, after the intake circulation valve is closed.

2. The internal combustion engine according to claim 1, wherein
the at least one controller is further programmed to open the exhaust circulation valve upon determining a predetermined time has elapsed after the intake circulation valve is closed.

3. The internal combustion engine according to claim 1, further comprising
the at least one controller is further programmed to set the predetermined amount based on the opened time of the intake circulation valve.

4. The internal combustion engine according to claim 1, further comprising
the at least one controller is further programmed to set the predetermined amount based on a downstream pressure of the supercharger in the intake passage.

5. The internal combustion engine according to claim 1, wherein
the predetermined amount is a volume of a passage space upstream of the confluence portion.

6. The internal combustion engine according to claim 1, further comprising
the at least one controller is further programmed to obtain the predetermined amount as a provisional value based on at least one of a downstream pressure of the supercharger in the intake passage and an opened time of the intake circulation valve; and
when the predetermined amount as the provisional value is greater than a passage space volume of a passage space upstream of the confluence portion, the at least one controller is further programmed to set the passage space volume as the predetermined amount, and when the predetermined amount as the provisional value is smaller than the passage space volume, the at least one controller is further programmed to set the predetermined amount as the provisional value of the predetermined amount.

7. A method for controlling an internal combustion engine, comprising:
providing a supercharger in an intake passage and an exhaust passage, which compresses and supplies intake air to an internal combustion engine main body;
carrying out intake recirculation by providing an intake circulation valve in an intake circulation passage that connects upstream and downstream side portions of the supercharger of the intake passage;
carrying out exhaust recirculation by providing an exhaust circulation valve in an exhaust circulation passage that connects the exhaust passage and the upstream side portion of the supercharger of the intake passage; and
closing the exhaust circulation valve upon determining the intake circulation valve is opened, and opening the exhaust circulation valve upon determining a predetermined amount of intake air has passed a confluence portion of the intake passage, where the exhaust circulation passage merges with the intake passage, after the intake circulation valve has been closed.

* * * * *